United States Patent
Fuchs et al.

(10) Patent No.: US 10,308,183 B2
(45) Date of Patent: Jun. 4, 2019

(54) FOLDING DEVICE FOR AN EXTERIOR MIRROR

(71) Applicant: MAGNA Auteca GmbH, Weiz (AT)

(72) Inventors: Reinhard Fuchs, Pischelsdorf (AT); Bernhard Schadler, Oberrettenbach (AT)

(73) Assignee: MAGNA Auteca GmbH, Weiz (AT)

(*) Notice: Subject to any disclaimer, the term of this patent is extended or adjusted under 35 U.S.C. 154(b) by 113 days.

(21) Appl. No.: 15/431,425

(22) Filed: Feb. 13, 2017

(65) Prior Publication Data

US 2017/0232900 A1    Aug. 17, 2017

(30) Foreign Application Priority Data

Feb. 16, 2016   (EP) .................................. 16155865

(51) Int. Cl.
- *G02B 5/08* (2006.01)
- *B60R 1/074* (2006.01)
- *F16H 1/20* (2006.01)
- *F16H 57/12* (2006.01)

(52) U.S. Cl.
CPC ............ *B60R 1/074* (2013.01); *F16H 1/203* (2013.01); *F16H 57/12* (2013.01); *F16H 2057/125* (2013.01)

(58) Field of Classification Search
CPC  B60R 1/074; B60R 1/076; B60R 1/07; F16H 1/203; F16H 57/12; F16H 2057/125; H02K 7/1166

USPC .......................................................... 359/841
See application file for complete search history.

(56) References Cited

U.S. PATENT DOCUMENTS

| | | | |
|---|---|---|---|
| 3,848,477 A | 11/1974 | Giandinoto et al. | |
| 2012/0087026 A1* | 4/2012 | Schuurmans | .......... B60R 1/074 359/841 |
| 2017/0320438 A1* | 11/2017 | Sulzle | ...................... B60R 1/06 |

FOREIGN PATENT DOCUMENTS

| | | |
|---|---|---|
| CN | 102102736 A | 6/2011 |
| DE | 19513970 A1 | 10/1996 |
| WO | 2015/008235 A1 | 1/2015 |

OTHER PUBLICATIONS

Notice of Reasons for Rejection for Japanese Patent Application No. 2017-024677, dated Apr. 3, 2018, 6 pages including 3 pages of English translation.

* cited by examiner

*Primary Examiner* — Euncha P Cherry

(74) *Attorney, Agent, or Firm* — Jordan IP Law, LLC; Todd A. Vaughn

(57) ABSTRACT

A folding device to move a mirror head relative to a mirror foot of a motor vehicle exterior mirror. The folding device includes a carrier operatively connected to one of the mirror head or the mirror foot, a motor attached to the carrier, the motor having a motor shaft, an output drive operatively connected to one of the mirror head or the mirror foot, a gear mechanism to operatively connect the output drive to the motor shaft, and a pressure device operatively connected to the carrier to engage and press the motor shaft against the motor.

15 Claims, 4 Drawing Sheets

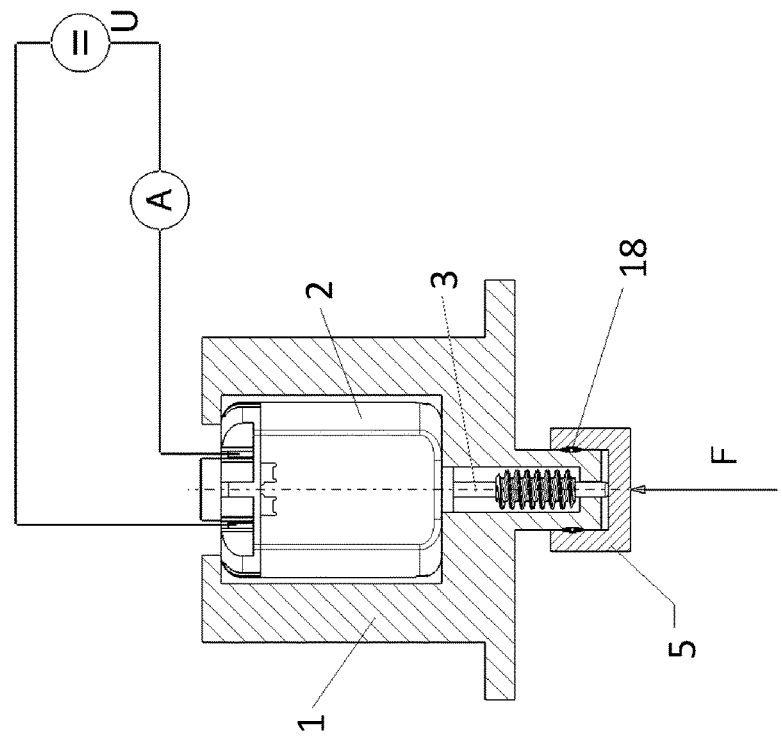
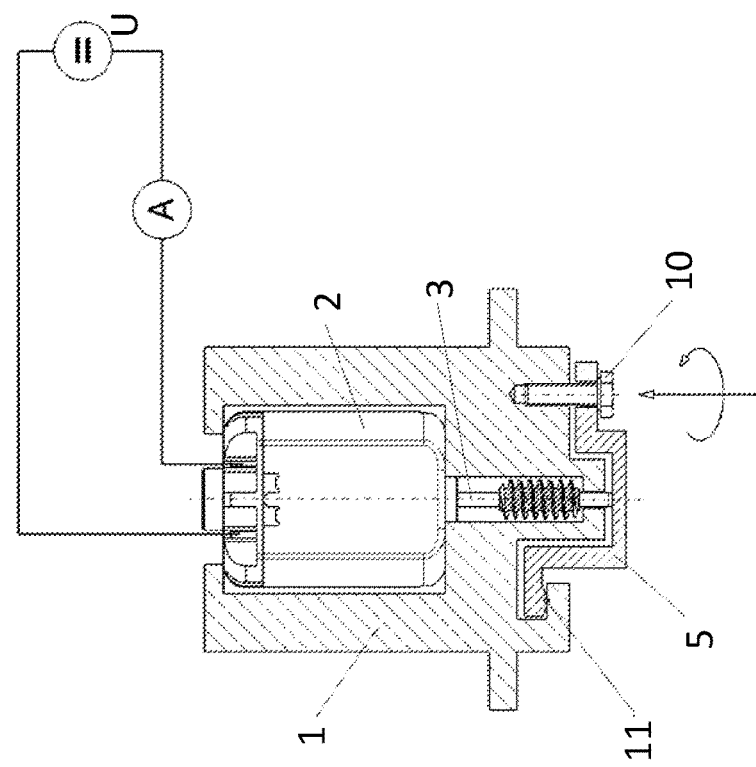

FOLDING DEVICE FOR AN EXTERIOR MIRROR

CROSS-REFERENCE TO RELATED APPLICATIONS

The present application claims priority 35 U.S.C. § 119 to European Patent Publication No. EP16155865.5 (filed on Feb. 16, 2016), which is hereby incorporated by reference in its complete entirety.

TECHNICAL FIELD

Embodiments relate to a folding device for an exterior mirror of a motor vehicle, an exterior mirror of a motor vehicle comprising such a folding device, and a method for setting such a folded device.

BACKGROUND

Folding devices are used in exterior mirrors of motor vehicles, wherein the exterior mirror can be adjusted by way of the folding device, in particular via an electrical drive of the folding device, between a driving position (folded out) and a parked position (folded in).

The drive of such a folding device normally comprises an electric motor with a motor shaft, which, for example, may activate, via a worm gear mechanism, a folding movement between the input drive and an output drive of the worm gear mechanism. A worm gear may be firmly pressed onto the motor shaft (motor worm gear). The axial forces which then act on the motor worm gear are absorbed internally in the motor in one direction, and in the other direction for example a housing element supports the motor shaft end.

The clamping dimension of the motor of such a folding device is subject to relatively large tolerances for production reasons. If the space available between a motor carrier and the housing element is too small, the resulting axial seizing causes an unacceptably high operating current of the motor. If however it is too large, on changes in rotation direction, noises are produced by the change in contact of the motor shaft. Because of the high motor rotation speed and the high mass (motor worm gear, motor shaft and sheet stack with copper windings), the pulse on a change of rotation direction is so great that a clear "click" noise is perceptible, which the driver of the motor vehicle finds disturbing.

SUMMARY

Embodiments relate to a folding device for an exterior mirror, and an exterior mirror comprising such a folding device, which causes less noise on changes of rotation direction and also requires a lower operating current.

Embodiments relate to a method for setting a folding device which allows optimised operation of the folding device.

In accordance with embodiments, a folding device for an exterior mirror of a motor vehicle that includes a mirror foot and a mirror head, wherein via the folding device, the mirror head can be folded in and/or out relative to the mirror foot, the folding device comprising: a carrier to be connected to one of the elements of mirror head or the mirror foot; a motor attached to the carrier with a motor shaft; an output drive to be connected to the other of the elements of mirror foot and the mirror head, the output drive being operatively connected to the motor shaft via a gear mechanism; and a pressure piece fixed to the carrier so as to press the motor shaft against the motor.

In accordance with embodiments, a folding device to move a mirror head relative to a mirror foot of a motor vehicle exterior mirror, the folding device comprising: a carrier operatively connected to one of the mirror head or the mirror foot; a motor attached to the carrier, the motor having a motor shaft; an output drive operatively connected to one of the mirror head or the mirror foot; a gear mechanism to operatively connect the output drive to the motor shaft; and a pressure device operatively connected to the carrier to engage and press the motor shaft against the motor.

In accordance with embodiments, An exterior mirror for a motor vehicle, the exterior mirror comprising: a mirror foot; a mirror head; and a folding device to move the mirror head relative to the mirror foot, the folding including a carrier operatively connected to one of the mirror head or the mirror foot; a motor attached to the carrier, the motor having a motor shaft; an output drive operatively connected to one of the mirror head or the mirror foot; a gear mechanism to operatively connect the output drive to the motor shaft; and a pressure device operatively connected to the carrier to engage and press the motor shaft against the motor.

In accordance with embodiments, a method for setting a folding device to move a mirror head relative to a mirror foot of a motor vehicle exterior mirror, the method comprising: supplying a motor of the folding device with a constant voltage; measuring a current intensity of a motor power supply; and establishing an operating current by adjusting a pressure of a pressure device of the folding device on a motor shaft.

In accordance with embodiments, a pressure piece is used to exert an optimised pressure on the motor shaft in order to achieve an optimised axial play of the motor shaft, and thus, reduce the noise development on load change.

In accordance with embodiments, a method for setting a folding device, comprising: supplying a motor with a constant voltage via a voltage source; measuring the current intensity of the motor power supply; changing the pressure of the pressure piece on the motor shaft, in particular, via an adjustment screw or a spindle or a cylinder, until an established current intensity is measured. In this way, in particular, on production of the folding device and/or the exterior mirror, an optimum axial play may be found for the motor shaft of the folding device so that noise development can be avoided, but the current intensity required can be kept low.

In accordance with embodiments, the gear mechanism of the folding device comprises at least one first worm gear, preferably also a second worm gear, wherein the first worm gear is mounted on the motor shaft and the second worm gear is mounted on an intermediate shaft. The first worm gear may drive a worm gear wheel on the intermediate shaft. The second worm gear on the intermediate shaft may intermesh with the further stationary worm gear serving as an output drive gear. On a folding movement, the motor, or preferably the intermediate shaft and the motor, may rotate around the stationary output drive. The worm gears may for example be configured as ZI gears. The worm gears may be configured as spur gears, in particular as spur gears with oblique toothing.

In accordance with embodiments, the pressure piece is arranged, in particular, clamped, between the motor shaft and a housing part, in particular, a cover.

In accordance with embodiments, the pressure piece may be adjusted substantially axially relative to the motor shaft via an adjustment screw, wherein the adjustment screw preferably engages with a thread in the carrier. The substantially axial adjustment of the pressure piece relative to the motor shaft may also be achieved if the pressure piece, in addition to an axial component of the movement, also has a component in a non-axial direction, for example on a pivot movement or tilt movement of the pressure piece about a pivot axis spaced from the motor shaft axis. Via a thread self-inhibition of the adjustment screw on the carrier, the pressure piece may be held in position after setting the desired axial play.

In accordance with embodiments, the pressure piece is inserted pivotably in the carrier, at least at one fixing point, preferably at a fixing axis, wherein the fixing point or fixing axis lies on a side of the motor shaft or motor shaft axis opposite the adjustment screw. The thread self-inhibition of the adjustment screw prevents an undesired tilting or pivoting of the pressure piece In accordance with embodiments, to maintain a specific axial play, the pressure piece may also be fixed to the carrier by form and/or material fit. In particular, the pressure piece may be welded, in particular if no adjustment screw is used which remains permanently on the folding device, or equivalent adjustment means such as for example a spindle. Thus as a whole, a folding device according to the invention may either have an adjustment means for adjusting the pressure piece relative to the motor shaft, and/or the pressure piece may be fixed, in particular welded, to the carrier after setting the optimum axial play.

In accordance with embodiments, the motor shaft and the axis of the output drive are parallel to each other, whereby the folding device may take up a small installation space.

In accordance with embodiments, the motor, the output drive and the gear mechanism may be positioned relative to each other between the motor shaft and the output drive by a single component, namely the carrier, so that the axial spacings of the motor shaft, the axis of the output drive and the axes of the gear elements lying in-between, in particular of an intermediate shaft, are established by the single component, namely the carrier. In this way, on an offset of the elements to be positioned, on installation there are no deviations in axial spacings, which would in turn lead to increased noise development and wear.

In accordance with embodiments, an exterior mirror of a motor vehicle may comprise a mirror foot, a mirror head and a folding device according to the invention, wherein the carrier of the folding device is connected to one of the elements of mirror head or mirror foot, wherein the output drive of the folding device is connected to the other of said elements, namely the mirror foot or the mirror head, so that via the folding device, the mirror head can be folded in and/or out relative to the mirror foot.

In accordance with embodiments, the carrier may be pre-tensioned, via a strong mirror head compression spring, against the element of mirror foot or mirror head which can be connected to the output drive, or against a locking plate rotationally fixed thereto. The mirror head compression spring may be part of a safety device which allows a twist between the mirror head and mirror foot under the action of a strong external force. The mirror head compression spring may be arranged outside the folding drive, or also integrated in the folding drive.

In accordance with embodiments, to set the axial play of the pressure piece of a folding device or an exterior mirror, the motor of the folding device may be supplied with a constant voltage via a voltage source, wherein the current intensity of the motor power supply is measured, wherein the pressure of the pressure piece on the motor shaft is changed, in particular increased, in particular via an adjustment screw or a spindle or a cylinder, until an established current intensity is measured.

In accordance with embodiments, when an adjustment screw is used which remains permanently attached to the folding device, no further fixing measures are necessary and the pressure piece is held in position by the thread self-inhibition of the adjustment screw.

In accordance with embodiments, in particular on use of a screw, spindle or for example pneumatic cylinder used solely for adjustment, when the established current intensity is present, the pressure piece is fixed to the carrier, in particular welded thereto.

DRAWINGS

Embodiments will be illustrated by way of example in the drawings and explained in the description below.

FIG. 4 illustrates a diagrammatic depiction of a method for setting the folding device via an adjustment screw, in accordance with embodiments.

FIG. 5 illustrates a diagrammatic depiction of a method for setting a folding device via welding, in accordance with embodiments.

DESCRIPTION

Figure 1:
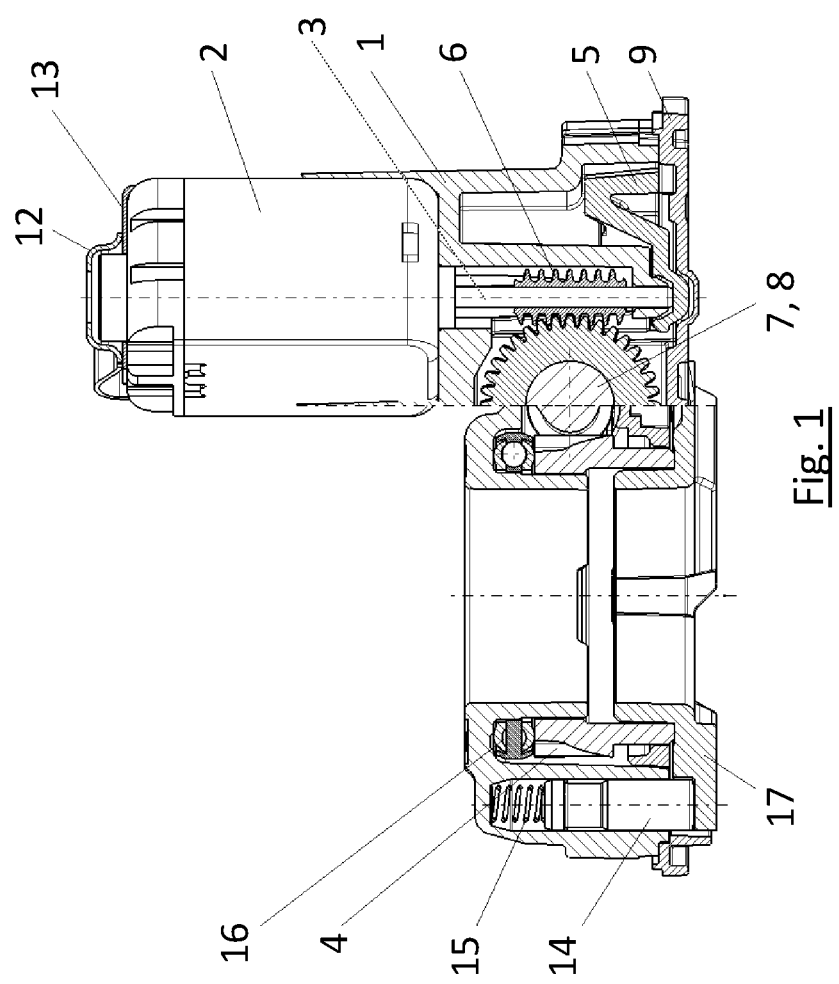
FIG. 1 illustrates a section view of a folding device, in accordance with embodiments.
Figure 2:
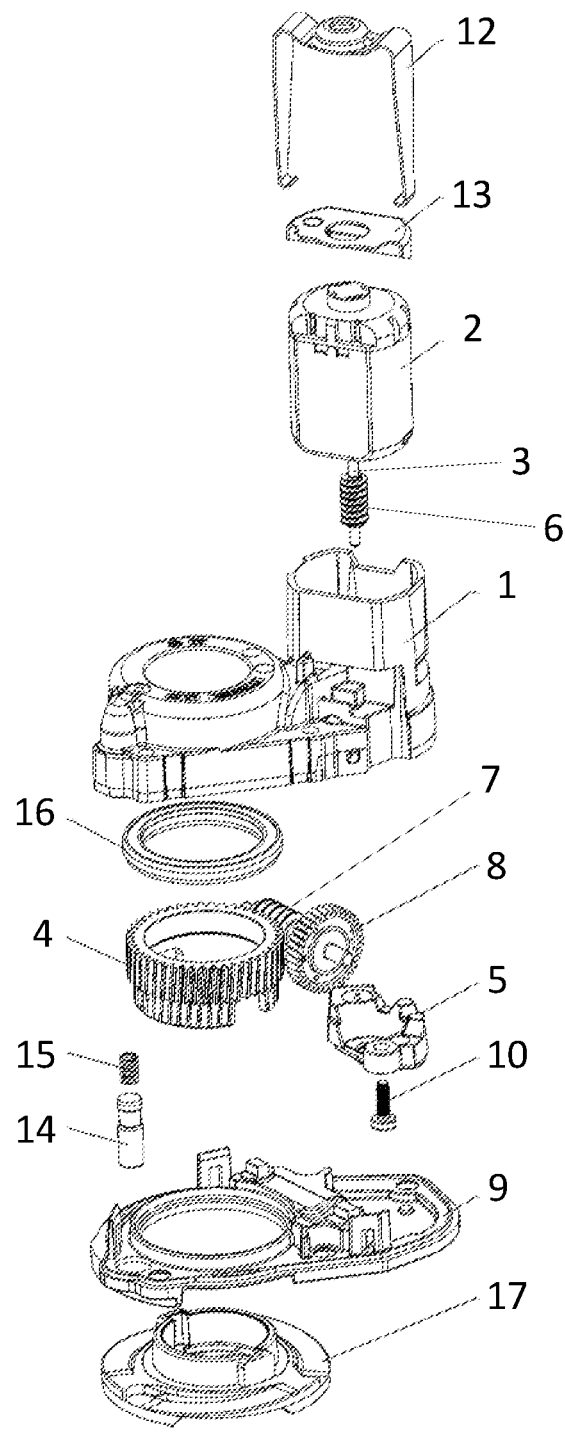
FIG. 2 illustrates a three-dimensional exploded depiction of the folding device of FIG. 1.

FIGS. 1 and 2 illustrate a folding device, in accordance with embodiments. The drive of the folding device, in particular the motor 2, is connected to a mirror head (not illustrated) of an exterior mirror via a carrier 1.

The output drive gear 4 is connected by form fit to the locking plate 17. The locking contour on the underside of the locking plate 17, together with a corresponding counter-contour on the mirror foot, forms a rotationally fixed connection which can be overcome on overload. The locking pin 14 loaded by a locking pin compression spring 15, together with a stop contour on the top side of the locking plate 17, predefines the driving position.

A gear mechanism between the motor 2 and the output drive gear 4 is configured as a two-stage worm gear mechanism. On a folding movement, an intermediate shaft 8 rotates about the stationary output drive gear 4. The intermediate shaft 8 has a worm gear made of steel, namely a second worm gear 7, which engages the output drive gear 4 and has a spray-moulded spur gear made of plastic. This spur gear is driven by the first worm gear 6, namely the motor worm gear, in which the motor worm gear is firmly pressed onto the motor shaft 3. The axial forces acting on the motor worm gear 6 are absorbed internally in the motor 2 in one direction, and in the other direction a pressure piece 5 supports a distal end of the motor shaft 3.

Figure 3:
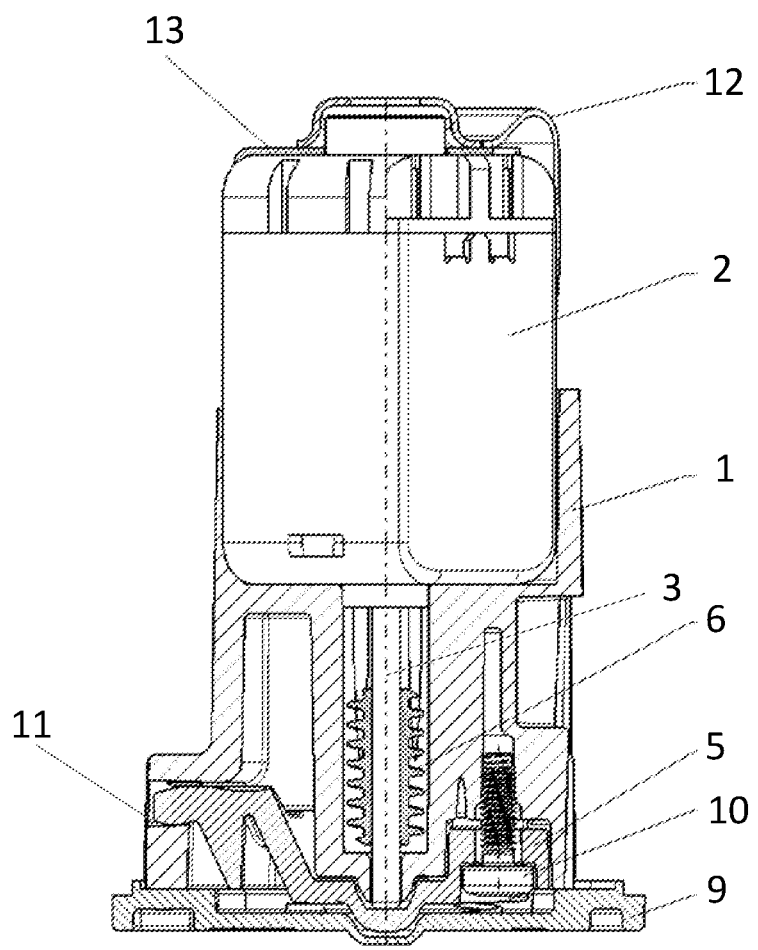
FIG. 3 illustrates a section view of the fitted pressure piece and the adjustment screw in a folding device, in accordance with embodiments.

The pressure piece 5 is arranged between the motor shaft 3 and a cover 9. FIG. 3 shows a more detailed section through the pressure piece 5 and the adjustment screw 10. The electric motor 2 is fixedly clamped in the carrier 1 via a motor fixing clamp 12. The motor shaft 3 in a front region thereof is guided radially in the carrier 1, but axially protrudes therefrom and is in contact with the pressure piece 5. The pressure piece 5 is configured for insertion in a slot of the carrier 1 so that the pressure piece 5 lies on the carrier 1 at a fixing point 11 or a fixing axis. The pressure piece 5 is adjustable in a direction towards the carrier 1 via an adjustment screw 10 which lies opposite the fixing point 11 relative to the motor shaft 3, so that the motor shaft 3 is arranged between the fixing point 11 and the adjustment screw 10, and thus, engages the motor shaft 3.

FIG. 4 illustrates a diagram of axial setting the motor shaft 3 using an adjustment screw 10. The pressure piece 5 is insertable in the carrier 1 and is pivotable about a fixing point 11. The motor 2 is powered via a connection to a direct voltage source U. The operating current of the motor 2, i.e., the current intensity, is measured via an ammeter A. When the adjustment screw 10 is manipulated via rotation, the pressure piece 5 rests on the carrier 1 and exerts a pressure on the motor shaft 3. The adjustment screw 10 is now manipulated via rotation until an established operating current is detected by the ammeter A. In this way a defined pretension ( =negative axial play) of the motor shaft 3 may be set/established.

FIG. 5 illustrates an alternative method for setting a folding device, and an alternative embodiment of a pressure piece 5, in accordance with embodiments. During assembly, the pressure piece 5 is to engage the carrier 1 via a screw, spindle or cylinder, with increasing force F until an established operating current is reached and displayed at the ammeter A. In this position, the pressure piece 5 is operatively connected to the carrier 1 by welding 18, for example, via laser welding.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second, etc. are used herein only to facilitate discussion, and carry no particular temporal or chronological significance unless otherwise indicated.

This written description uses examples to disclose the invention, including the preferred embodiments, and also to enable any person skilled in the art to practice the invention, including making and using any devices or systems and performing any incorporated methods. The patentable scope of embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, may be mixed and matched by one of ordinary skill in the art to construct additional embodiments and techniques in accordance with principles of this application.

LIST OF REFERENCE SIGNS

1 Carrier
2 Motor
3 Motor shaft
4 Output drive
5 Pressure piece
6 First worm gear
7 Second worm gear
8 Intermediate shaft
9 Cover
10 Adjustment screw
11 Fixing point
12 Motor fixing clamp
13 Isolation cap
14 Locking pin
15 Locking pin compression spring
16 Axial ball bearing
17 Locking plate
18 Welding
U Power source
A Ammeter
F Force

What is claimed is:

1. A folding device to move a mirror head of a motor vehicle exterior mirror relative to a mirror foot of the motor vehicle exterior mirror, the folding device comprising:
    a carrier operatively connected to one of the mirror head or the mirror foot;
    a motor attached to the carrier, the motor having a motor body and a motor shaft;
    an output drive operatively connected to one of the mirror head or the mirror foot;
    a gear mechanism to operatively connect the output drive to the motor shaft;
    a pressure device operatively connected to the carrier to engage and press the motor shaft against the motor body; and
    an adjustment device to adjust the pressure device substantially axially relative to the motor shaft, wherein the adjustment device includes an adjustment screw having threads to fix the adjustment screw to the carrier so that the pressure device is held in position.

2. The folding device of claim 1, wherein the gear mechanism comprises at least one first worm gear mounted on the motor shaft, and a second worm gear mounted on an intermediate shaft.

3. The folding device of claim 1, wherein the pressure device is arranged between the motor shaft and a cover.

4. The folding device of claim 1, wherein the adjustment screw is configured to engage an internal thread of the carrier.

5. The folding device of claim 4, wherein the pressure device is operatively connected to the carrier so as to pivot about a fixing axis.

6. The folding device of claim 5, wherein the fixing axis lies on a side of the motor shaft opposite the adjustment screw.

7. A method for setting a folding device to move a mirror head of a motor vehicle exterior mirror relative to a mirror foot of the motor vehicle exterior mirror, the method comprising:
    supplying a motor of the folding device with a constant voltage;
    measuring a current intensity of a motor power supply that is to power the motor;
    establishing an operating current of the motor by adjusting, based on the measured current intensity, a pressure of a pressure device of the folding device on a motor shaft of the motor; and
    fixing, when the operating current is established, the pressure device to a carrier of the folding device by screwing a screw into the carrier.

8. A folding device to move a mirror head relative to a mirror foot of a motor vehicle exterior mirror, the folding device comprising:
    a carrier operatively connected to one of the mirror head or the mirror foot;

an electric motor attached to the carrier, the electric motor having a motor body and a motor shaft;

an output drive operatively connected to one of the mirror head or the mirror foot;

a gear mechanism to operatively connect the output drive to the motor shaft;

a pressure device operatively connected to the carrier to engage and press the motor shaft against the motor body; and an adjustment device, to protrude through the pressure device, and to adjust the pressure device substantially axially relative to the motor shaft.

9. The folding device of claim 8, wherein the gear mechanism comprises at least one first worm gear mounted on the motor shaft, and a second worm gear mounted on an intermediate shaft.

10. The folding device of claim 8, wherein the pressure device is arranged between the motor shaft and a cover.

11. The folding device of claim 8, wherein the adjustment device comprises an adjustment screw.

12. The folding device of claim 11, wherein the adjustment screw is configured to engage an internal thread of the carrier.

13. The folding device of claim 12, wherein the pressure device is operatively connected to the carrier so as to pivot about a fixing axis.

14. The folding device of claim 13, wherein the fixing axis lies on a side of the motor shaft opposite the adjustment screw.

15. The folding device of claim 8, wherein the adjustment device is to be in direct contact with the pressure device and the carrier.

* * * * *